Figure 1:
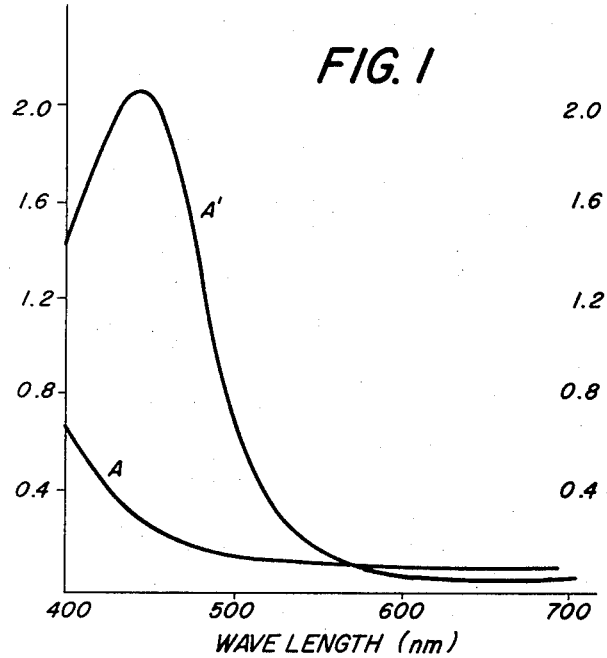

United States Patent [19]

Bush et al.

[11] 3,791,827

[45] Feb. 12, 1974

[54] 'ONIUM INDOPHENOXIDES

[75] Inventors: Walter Monroe Bush, Victor; John Warburton Gates, Jr.; Robert John Newmiller, both of Rochester, all of N.Y.

[73] Assignee: Eastman Kodak Company, Rochester, N.Y.

[22] Filed: Aug. 6, 1971

[21] Appl. No.: 169,706

[52] U.S. Cl............................. 96/22, 96/55, 96/74
[51] Int. Cl........................... G03c 5/50, G03c 7/32
[58] Field of Search................... 96/66 R, 22, 55, 74

[56] References Cited
UNITED STATES PATENTS
3,017,271   1/1962   Piper............................... 96/107 X

*Primary Examiner*—Norman G. Torchin
*Assistant Examiner*—Alfonso T. Suro Pico
*Attorney, Agent, or Firm*—Robert W. Hampton

[57] ABSTRACT

'Onium indophenoxide compounds are disclosed with processes for preparation of 'onium indophenoxides. In one embodiment, improved photographic processes are described for forming indophenoxide image dyes in a photographic element. Another embodiment relates to improved photographic elements containing 'onium indophenoxide image dyes.

30 Claims, 11 Drawing Figures

PATENTED FEB 12 1974  3,791,827

WALTER M. BUSH
JOHN W. GATES JR.
ROBERT J. NEWMILLER
INVENTOR.

BY  *Gerald Battist*
ATTORNEY

WALTER M. BUSH
JOHN W. GATES JR.
ROBERT J. NEWMILLER
INVENTOR.

BY

*Gerald Battist*
ATTORNEY

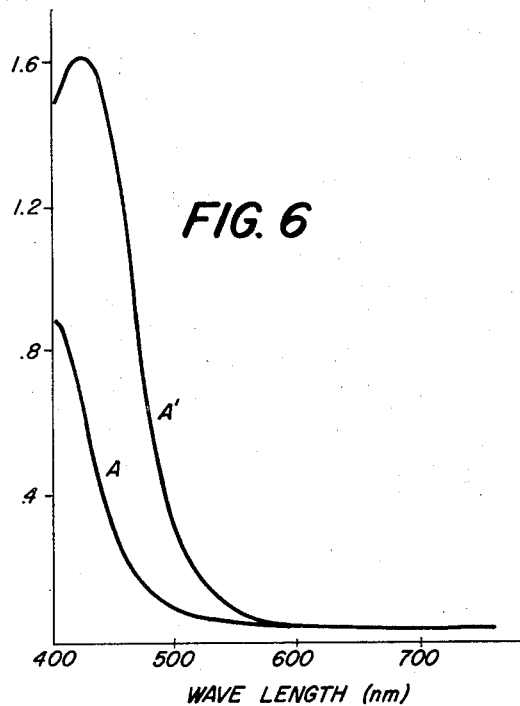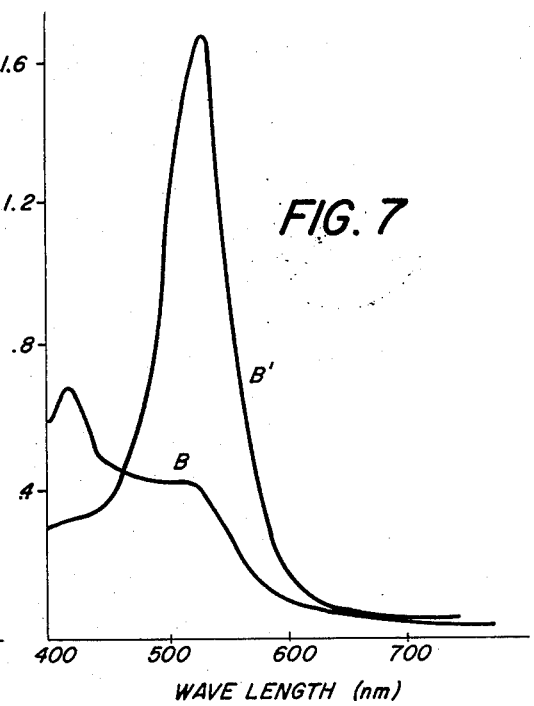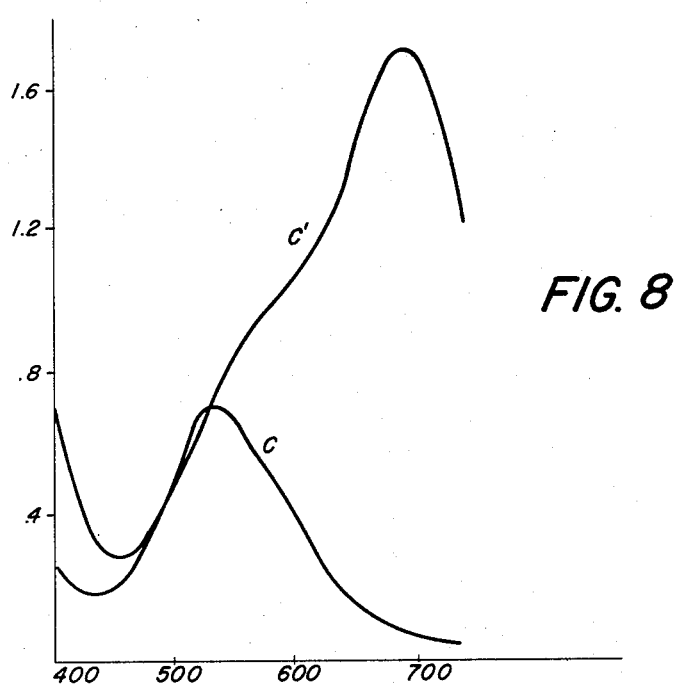

WALTER M. BUSH
JOHN W. GATES JR.
ROBERT J. NEWMILLER
INVENTOR.

'ONIUM INDOPHENOXIDES

This invention relates to dyes, processes of making dyes, elements containing these dyes and processes for using elements containing said dyes. In one aspect, this invention relates to methods for producing 'onium indophenoxide dye images in photographic elements. In another aspect, this invention relates to processes of reacting a color coupler with an oxidized p-aminophenol to form a dye in the presence of or with subsequent treatment with a positively charged compound, such as a quaternary ammonium compound, to form dyes which are useful in applications, such as image dyes in photographic elements.

Several procedures have been suggested in the prior art with respect to reaction of oxidized primary amino color developing agents with certain couplers to form dye images which are useful in photography, such as in substractive color processes. Several early patents discussed the possibility of using p-phenylenediamines and aminophenols as color developing agents. However, it soon became evident that p-phenylenediamines having one dialkyl-substituted nitrogen atom were regarded as the most practical color developing agent, as evidenced in "30 Years of Modern Colour Photography," *The British Journal of Photography*, July 15, 1966, 607; German Patent 253,335; *The Reproduction of Color*, by R. W. G. Hunt, John Wiley & Sons, Inc., 1967; and the like. It is believed that dyes formed from p-aminophenols and couplers were not strongly considered for photographic uses since the dyes did not have desirable absorption properties for use in color photography; for example, they had very low extinction coefficients and/or absorption maxima, and in many instances were subject to absorption changes with minor adjustments in pH around a pH of 6-7, which is the adjusted residual pH in many photographic elements after image development. Therefore, p-aminophenols were generally not used as the primary color developer in deference to dyes formed with p-phenylenediamine color developers wherein one of the nitrogen atoms had two polyatom substituents thereon.

We have now found that highly desirable photographic image dyes can be produced by reacting dye-forming couplers such as pyrazolones, phenols, open-chain active methylene couplers and the like with oxidized p-aminophenols in the presence of or by subsequent reaction with a positively charged compound, such as an 'onium compound and preferably a quaternary compound to form an 'onium indophenoxide. The dyes can be formed very easily and rapidly and have good stability with improved spectrophotometric qualities of the images formed by said dyes. The dyes formed by this method are stable to light and heat and in many embodiments they are substantially unaffected by the pH changes associated with most photographic elements. Moreover, the dyes have desirable spectrophotometric properties including useful absorption maxima within the visible spectrum, narrow band widths and high extinction coefficients.

In addition, the 'onium indophenoxides appear to overcome some of the problems occurring with prior-art image dyes in photographic elements, especially wheere the element is washed or remains wet for extended periods; the 'onium indophenoxides formed with a polymeric 'onium compound do not appear to wash out or migrate as readily as other dyes, for example, an indophenol dye mordanted on a polyvinyl pyridine.

In one embodiment, this invention relates to new compositions of matter which can be characterized as 'onium indophenoxides.

In another embodiment, this invention relates to processes of forming 'onium indophenoxides by reacting photographic color-forming couplers with an oxidized p-aminophenol in association with an 'onium compound.

In another embodiment, this invention relates to photographic elements comprising 1) a support, 2) at least one layer thereon containing a silver halide emulsion, 3) at least one layer in association with said silver halide emulsion containing a color-forming coupler and 4) at least one layer in association with said silver halide emulsion comprising a concentration of a p-aminophenol sufficient to form an image in said photographic element after imagewise exposure.

The 'onium compound can be contacted with the element after development, but is preferably present in at least one layer of the element in association with the p-aminophenol or color-forming coupler.

In a highly preferred embodiment, this invention relates to dyestuffs which can be used in photographic elements which have a residual pH of between 5-9 after processing.

In another highly preferred embodiment, this invention relates to a photographic element comprising a support and a layer thereon containing a blue-sensitive silver halide composition having associated therewith a yellow color coupler, a layer containing a green-sensitive silver halide emulsion having associated therewith a magenta color coupler and a layer containing a red-sensitive silver halide emulsion having associated therewith a cyan color coupler, wherein said element is processed in a silver halide developing composition wherein the color developing agent is predominantly a p-aminophenol or wherein said photographic element comprises an incorporated p-aminophenol developing agent in at least one layer. In certain preferred variations thereof, the element also contains an 'onium salt and more preferably a quaternary ammonium salt in at least one layer thereof.

The dyes of this invention are very useful in photographic elements, but they can also be used as textile dyes, dyes for petroleum products, dyes for synthetic polymers, dyes for natural resins, dyes for paint substances, and the like.

FIGS. 1–11 which form a part of the specification are spectral absorption curves of several dyes according to this invention. Further details with respect to the specific dyes represented in FIGS. 1–11 are set forth in the examples.

The couplers which are generally useful in producing the 'onium indophenoxides of this invention are those compounds which have an active coupling group which will react with an oxidized aromatic primary amine, such as exemplified by the many couplers which have been used in the prior art in combination with p-phenylenediamines. Typical useful couplers include compounds having open-chain active methylene groups, pyrazolone compounds, phenolic compounds and the like which, when reacted with an oxidized p-aminophenol, form an indophenol compound, i.e., indophenol, indothiophenol, azomethines and the like.

The compounds referred to herein as couplers contain a "coupling position" which is generally known to those skilled in the art as being the position on the coupler molecule that reacts or couples with oxidized color developing agents. Typical useful couplers include phenolic couplers, including α-naphthols which couple at the 4-position, open-chain ketomethylene couplers which couple at the carbon atom forming the methylene moiety (e.g.,

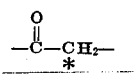

wherein * denotes the coupling position, 5-pyrazolone couplers which couple at the carbon atom in the 4-position, and the like. Typical specific coupler compounds which can be reacted with oxidized p-aminophenols to form the image dye intermediate according to this invention are disclosed in U.S. Pat. Nos. 2,407,210 by Weissberger et al. issued Sept. 3, 1946; 2,298,443 by Weissberger issued Oct. 13, 1942; 2,875,057 by McCrossen et al. issued Feb. 24, 1959; 3,265,506 by Weissberger et al. issued Aug. 9, 1966; 3,408,194 by Loria issued Oct. 29, 1968; 3,447,928 by Loria issued June 3, 1969; 2,369,489 by Porter et al. issued Feb. 13, 1945; 2,600,788 by Loria et al. issued June 17, 1952; 2,908,573 by Bush et al. issued Oct. 13, 1959; 3,062,653 by Weissberger et al. issued Nov. 6, 1962; 3,419,391 by Young issued Dec. 31, 1968; 3,519,429 by Lestina issued July 7, 1970; 3,152,896 by Tuite issued Oct. 13, 1964; 2,423,730 by Salminen et al. issued July 8, 1947; 2,474,293 by Weissberger et al. issued June 28, 1949; 3,476,563 by Loria issued Nov. 4, 1969; 2,772,162 by Salminen et al. issued Nov. 27, 1956; and 3,002,836 by Vittum et al. issued Oct. 3, 1961; which are all incorporated herein by reference.

The couplers of this invention include the diffusible couplers, the nondiffusible couplers including the Fischer-type couplers and the like, for example, as exemplified by the cyanforming dye couplers disclosed in Loria, U.S. Pat. No. 3,476,563 issued Nov. 4, 1969. The couplers of this invention can generally be incorporated in the layers of the photographic element by the methods known in the art and also as suggested in Loria, U.S. Pat. No. 3,476,573.

The dyes of this invention can be generally referred to as 'onium indophenoxides and can generally be represented by the formula: $(COUP)=N-Ar-O^\ominus M^\oplus$, where M is an 'onium group including sulfonium and phosphonium 'groups and preferably is a quaternary ammonium group; Ar is an arylene group containing six to 20 carbon atoms including substituted and unsubstituted arylene groups, fused-ring substituents and the like, and is preferably a phenylene group which preferably is substituted with halogen atoms or groups containing halogen atoms in the ortho or meta positions of the ring; and COUP is a color-forming coupler linked through a carbon atom such as a phenolic coupler, a pyrazolone coupler, couplers having open-chain active methylene groups and the like, including ballasted couplers which are generally insoluble in aqueous media, diffusible couplers which can have solubilizing groups attached thereto, and the like.

The p-aminophenols which can be reacted in the oxidized form to provide the dye intermediates of this invention are generally any substituted or unsubstituted p-aminophenol which has a primary amine on the ring and a para hydroxy group. In those instances where high solubility of the developer or the formed dye intermediate is desired, such as to form diffusible dye intermediates, water solubilizing groups such as halogen groups or halogen-containing groups are preferably substituted in the ortho and/or meta positions of the ring. Generally useful p-aminophenols include those compounds represented by the formula: $H_2N-Ar-OH$, where Ar is an arylene group containing from 6–20 carbon atoms including substituted arylene, unsubstituted arylene, fused-ring arylene and the like, and is preferably a phenylene group containing six carbon atoms and is unsubstituted or can have substituents in the ortho and/or meta positions which are preferably halogen atoms or groups containing halogen atoms. Typical useful species of p-aminophenols are identified specifically in Examples 1 and 11–48.

The indophenol compounds are formed in the presence of or with subsequent treatment with 'onium compounds to form the 'onium indophenoxide. The 'onium compounds can be soluble compounds which can be added by contacting the indophenol with a solution of the 'onium compound or high-molecular-weight compounds which are relatively insoluble in water and can be placed in at least one layer of the photographic element, such as in the image layer where the indophenol produces the 'onium indophenoxide image dye.

'Onium compounds have been used in the photographic art for quite some time. For example. U.S. Pat. No. 2,648,604 discloses the use of non-surface-active quaternary compounds as development accelerators, and U.S. Pat. Nos. 2,271,623, 2,271,622 and 2,275,727 disclose the use of quaternary ammonium, quaternary phosphonium and tertiary sulfonium compounds as sensitizers for silver halide emulsions. Moreover, U.S. Pat. Nos. 3,146,102 and 3,212,893 disclose the use of 'onium compounds in combination with dye developers in image transfer systems. Nevertheless, there does not appear to be any recognition in the art of the highly useful 'onium indophenoxide dyes as set forth in this invention.

In one embodiment, especially useful dye images have been obtained through the combination of indophenols and quaternary ammonium compounds. As is known, quaternary ammonium compounds are organic compounds containing a pentavalent nitrogen atom. Generally, they can be considered as derivatives of ammonium compounds wherein the four valences usually occupied by the hydrogen atoms are occupied by organic radicals. Generally, the organic radicals are joined directly to the pentavalent nitrogen through a single or double carbon-to-nitrogen bond. The term "quaternary ammonium," as used herein, is intended to cover compounds wherein the pentavalent nitrogen is one of the nuclear atoms in a heterocyclic ring, as well as those wherein each of the four vacancies is attached to separate organic radicals, e.g., tetraalkyl quaternary ammonium compounds. Useful quaternary ammonium compounds can be represented by the following formulae:

(1) 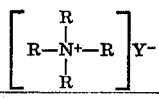

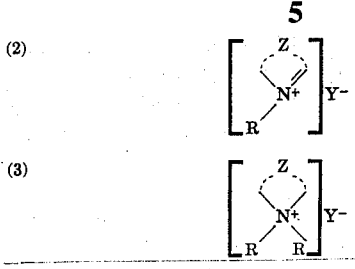

wherein each R is an organic radical, Y is an anion, e.g., hydroxy, bromide, chloride, toluenesulfonate, etc., and Z represents the atoms necessary to complete a heterocyclic ring. Examples of compounds within Formulae 1, 2 and 3 include tetra-ethylammonium bromide, N-ethylpyridinium bromide, N,N-diethyl-piperidinium bromide, ethylene-bis-pyridinium bromide, 1-ethyl-pyridinium bromide, 1-phenethyl-3-picolinium bromide, tetraalkylammonium salts, cetyl-trimethylammonium bromide, polyalkylene oxide bis-quaternary ammonium salts such as polyethylene oxide bis-pyridinium perchlorate, the heterocyclic quaternary ammonium salts mentioned which form the methylene bases including 3-methyl-2-ethylisoquinolinium bromide, 3-methylisoquinolinium methyl-p-toluenesulfonate, 1-ethyl-2-methyl-3-phenethylbenzimidazolium bromide, 5,6-dichloro-1-ethyl-2-methyl-3-(3-sulfobutyl)-benzimidazolium betaine and the pyridinium salts below.

Other useful 'onium compounds include tertiary sulfonium and quaternary phosphonium compounds represented by the formulae:

$$(R)_3S^+X^-  \quad (4)$$

and $$(R)_4P^+X^-  \quad (5)$$

wherein each R is an organic radical, e.g., alkyl, aralkyl, aryl, etc., groups, and X is an anion, e.g., hydroxy, bromide, chloride, toluenesulfonate, etc. Typical tertiary sulfonium and quaternary phosphonium compounds include lauryldimethylsulfonium p-toluenesulfonate, nonyldimethylsulfonium p-toluenesulfonate and octyldimethylsulfonium p-toluenesulfonate, butyldimethylsulfonium bromide, triethylsulfonium bromide, tetraethylphosphonium bromide, dimethylsulfonium p-toluenesulfonate, dodecyldimethylsulfonium p-toluenesulfonate, decyldimethylsulfonium p-toluene-sulfonate and ethylene-bis-oxymethyltriethylphosphonium bromide.

The 'onium compounds may be used as the hydroxide or as the salt. When the 'onium compounds are used as the salt, the anion may be a derivative of any acid. However, it should be noted that when the anion is iodide, such iodide may have deleterious effects on the emulsion and suitable precautions should be taken if it is to be in contact with the emulsion before development is complete. Especially good results are obtained when the 'onium compounds employed are bromides.

Useful heterocyclic quaternary ammonium compounds which form the methylene bases diffusible in alkaline solution have the general formula:

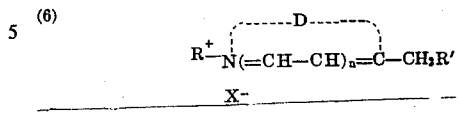

wherein D represents the nonmetallic atoms necessary to complete the heterocyclic nucleus of the quaternary ammonium compound containing 1 or more of the reactive methyl groups —$CH_2R'$ in one or more of the nuclear positions, the other nuclear positions being substituted or not, such as quaternary salts of the pyridine, quinoline, benzoquinoline, benzoxazole, benzoselenazole, thiazole, benzothiazole, naphthothiazole, benzimidazole, isoquinoline series, etc.; $n$ is 0 or 1; R is an alkyl group, an aryl or aralkyl group of the benzene series, or substituted alkyl, aryl or aralkyl groups of the benzene series, the alkyl chains preferably being lower alkyl of from one to four carbon atoms; R' is a hydrogen atom or one of the groups represented by R; and X represents OH— or an acid anion such as Br—, $CH_3SO_4$— or

One or more of these quaternary ammonium compounds can be used alone or in combination with the 'onium compounds having the Formulae 1, 2, 3, 4 and 5 above, and are advantageously employed in either the processing solution, the photographic element, or both.

Typical 'onium salts which are useful in the invention which form diffusible methylene bases are as follows:

1-benzyl-2-picolinium bromide

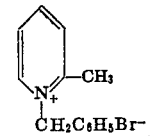

1-(3-bromopropyl)-2-picolinium p-toluenesulfonate
1-phenethyl-2-picolinium bromide
1-γ-phenylpropyl-2-picolinium bromide
2,4-dimethyl-1-phenethylpyridinium bromide
2,6-dimethyl-1-phenethylpyridinium bromide
5-ethyl-2-methyl-1-phenethylpyridinium bromide
2-ethyl-1-phenethylpyridinium bromide
1-[3-(N-pyridinium bromide)propyl]-2-picolinium p-toluenesulfonate

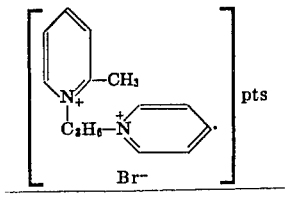

anhydro-1-(4-sulfobutyl)-2-picolinium hydroxide

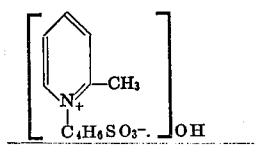

α-picoline-β-naphthoylmethyl bromide

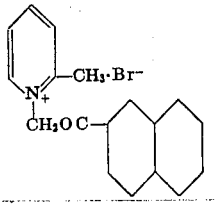

1-β-phenylcarbamoyloxyethyl-2-picolinium bromide

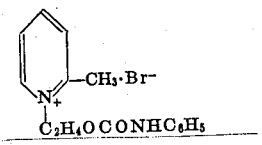

1-methyl-2-picolinium p-toluenesulfonate
1-phenethyl-2,4,6-trimethylpyridinium bromide
1-phenethyl-4-n-propylpyridinium bromide
4-γ-hydroxypropyl-1-phenethylpyridinium bromide
and 1-n-heptyl-2-picolinium bromide A number of pyridinium salts having the above general formula generally useful as nondiffusible 'onium salts are:

1-n-decyl-2-picolinium bromide
1,2-dibenzylpyridinium bromide
6-amino-1-phenethyl-2-picolinium bromide
2-amino-1-phenethyl-4-picolinium bromide
2-benzyl-1-phenethylpyridinium bromide and
4-benzyl-1-phenethylpyridinium bromide The following, which do not form methylene bases in alkali solutions, also can be used:

1-phenethylpyridinium bromide
1-ethylpyridinium bromide
1-phenethyl-3-picolinium bromide and
1-n-nonylpyridinium p-toluenesulfonate In one embodiment of the invention, the image dye is mordanted in a polymeric material such as a polymer with 'onium groups thereon. Typical useful mordants of this type are vinylpyridinium compounds of the type disclosed in U.S. Pat. No. 2,484,430; polymers containing quaternary ammonium groups such as disclosed in U.S. Ser. Nos. 734,873 by Cohen et al. filed June 6, 1968, now U.S. Pat. No. 3,625,694, 100,487 by Cohen et al. filed Dec. 21, 1970, 100,491 by Cohen et al. filed Dec. 21, 1970, now U.S. Pat. No. 3,709,690 issued Jan. 9, 1973, and 709,793 by Cohen et al. filed Mar. 1, 1968, now U.S. Pat. No. 3,639,357, and U.S. Pat. Nos. 3,488,706 by Cohen et al. issued Jan. 6, 1970, and 3,557,006 by Cohen et al. issued Jan 19, 1970; and the like.

In another embodiment, the mordant is an 'onium coacervate mordant such as disclosed in Bush, U.S. Pat. No. 3,271,147 issued Sept. 6, 1966.

The 'onium salts are generally used in concentrations necessary to form an 'onium indophenoxide with all of the indophenol present in the photographic element. When the 'onium compound is immobile or ballasted and present in an image layer, it is generally utilized in concentrations of about 25 mg. to about 1,000 mg. per square foot, and preferably about 50 to about 500 mg. per square foot, depending, of course, on the ratio of 'onium atoms to molecular weight of the compound employed. When the 'onium salt is supplied by a solution such as in the processing solution, typical useful concentrations range from 0.01 percent by weight to about 5 percent by weight of the 'onium compound to provide complete reaction, again depending on the concentration of the dye in the photographic element and the ratio of 'onium groups to molecular weight of the 'onium compound.

The 'onium phenoxides can generally be formed in situ in any of the color systems employing color-forming couplers; several exemplary systems are disclosed by Weissberger, "A Chemist's View of Color Photography," *American Scientist*, Vol. 58, No. 6, Nov.–Dec., 1970, pp. 648–660.

In the photographic systems of this invention, the couplers, developers and 'onium salts can be incorporated in various layers of the element in water-permeable association, or the respective ingredients can be introduced into the element at various stages of processing. However, the color-forming couplers are preferably incorporated in the photographic element in association with a silver halide emulsion. The p-aminophenol developing agent can be contacted with the exposed silver halide emulsion after exposure by use of liquid processing composition containing the developing agent and, in one embodiment, the p-aminophenol is preferably incorporated in the silver halide emulsion layer wherein it can be activated by a liquid such as an alkaline solution. It is also understood that auxiliary developing agents such as pyrazolidones, ascorbic acids, p-phenylenediamines and the like can be used in the process, if desired, to achieve variations in image properties and development characteristics.

In one embodiment of this invention, the new dyes can be formed in a reversal color process. The coupler can be incorporated in the photographic element and preferably contains a ballast group to immobilize the coupler and prevent migration when it is located in a multicolor element. A p-aminophenol developer is used at the appropriate stage, depending on the type of system, to develop the exposed silver halide whereby the oxidized p-aminophenol can react with the color-forming coupler. In the embodiments where a minimum number of solubilizing groups are placed on the coupler and the p-aminophenol contains no substantial additional solubilizing groups, the coupler need not be ballasted as the coupled reaction product will generally be insoluble. The reaction product is formed in the presence of, or subsequently treated with, a positively charged compound such as an 'onium salt to form the desired image dye. It will be appreciated, of course, that the solubility of the coupler and the p-aminophenol developer will depend on the desired characteristics of the photographic system, the degree of tolerable color contamination, the type of barrier layer employed in the system, and the like.

In another embodiment, water-soluble color couplers are added to the emulsion prior to or during the color developing step wherein the respective color coupler will react with the oxidized p-aminophenol to form an indophenol. The indophenol is then contacted with the 'onium compound to form the 'onium phenoxide which yields the desired image dye. In embodiments of this type, silver halide layers sensitized to different colors can be developed sequentially to obtain the desired color in each layer or they can be developed simultaneously, for example, when emulsions sensitized to different colors are coated on opposite sides of a film support.

The silver halide emulsions used with this invention can comprise silver chloride, silver bromide, silver bromoiodide, silver chlorobromoiodide or mixtures thereof. The emulsions may be coarse- or fine-grain and can be prepared by any of the well-known procedures, e.g., single-jet emulsions, double-jet emulsions, such as Lippmann emulsions, ammoniacal emulsions, thiocyanate or thioether ripened emulsions such as those described in U.S. Pat. Nos. 2,222,264 by Nietz et al., 3,320,069 by by Illingsworth, and 3,271,157 by McBride. Surface-image emulsions can be used or internal-image emulsions can be used such as those described in U.S. Pat. Nos. 2,592,250 by Davey et al., 3,206,313 by Porter et al., and 3,447,927 by Bacon et al. The emulsions may be regular-grain emulsions such as the type described in Klein and Moisar, *J. Phot. Sci.*, Vol. 12, No. 5, Sept./Oct., 1964, pp. 242-251. If desired, mixtures of surface- and internal-image emulsions can be used as described in Luckey et al., U.S. Pat. No. 2,996,382.

Negative-type emulsions can be used or direct-positive emulsions can be used such as those described in U.S. Pat. Nos. 2,184,013 by Leermakers, 2,541,472 by Kendall et al., 3,367,778 by Berriman, 2,563,785 by Ives, 2,456,953 by Knott et al. and 2,861,885 by Land, British Patent 723,019 by Schouwenaars, and U.S. Pat. No. 3,501,307 by Illingsworth.

The silver halide emulsions may be unwashed or washed to remove soluble salts. In the latter case, the soluble salts may be removed by chill-setting and leaching or the emulsion may be coagulation-washed, e.g., by the procedures described in U.S. Pat. Nos. 2,618,556 by Hewitson et al., 2,614,928 by Yutzy et al., 2,565,418 by Yackel, 3,241,969 by Hart et al., and 2,489,341 by Waller et al.

Also, the silver halide emulsions may contain speed-increasing compounds such as polyalkylene glycols, cationic surface active agents and thioethers or combinations of these as described in U.S. Pat. Nos. 2,886,437 by Piper, 3,046,134 by Dann et al., 2,944,900 by Carroll et al., and 3,294,540 by Goffe.

Likewise, the silver halide emulsions can be protected against the production of fog and can be stabilized against loss of sensitivity during keeping. Suitable antifoggants and stabilizers each used alone or combination include thiazolium salts described in U.S. Pat. Nos. 2,131,038 by Brooker et al., and 2,694,716 by Allen et al.; the azaindenes described in U.S. Pat. Nos. 2,886,437 by Piper and 2,444,605 by Heimbach et al.; the mercury salts as described in Allen et al., U.S. Pat. No. 2,728,663; the urazoles described in Anderson et al., U.S. Pat. No. 3,287,135; the sulfocatechols described in Kennard et al., U.S. Pat. No. 3,236,652; the oximes described in Carroll et al., British Pat. No. 623,448; nitron; nitroindazoles; the mercaptotetrazoles described in U.S. Pat. Nos. 2,403,927 by Kendall et al., 3,266,897 by Kennard et al., and 3,397,987 by Luckey et al.; the polyvalent metal salts described in Jones, U.S. Pat. No. 2,839,405; the thiuronium salts described in Herz et al., U.S. Pat. No. 3,220,839; the palladium, platinum and gold salts described in U.S. Pat. Nos. 2,566,263 by Trivelli et al. and 2,597,915 by Yutzy et al.

The invention can be further illustrated by the following examples.

EXAMPLE 1

A. A sample of a supported single-layer gelatinous silver halide emulsion coating, containing per square foot of coating 107 mg. silver, 300 mg. gelatin, 80 mg. of the yellow-dye-forming coupler α-[3-(α-(2,4-di-tert-amylphenoxy)butramido)-benzoyl]-2-methoxyacetamide (Coupler I) and 40 mg. of the coupler solvent dibutylphthalate, is exposed to a graduated-density test object and developed for 16 minutes at a temperature of 20° C. (68° F.) in a developing solution of the following composition:

| | |
|---|---|
| 2,6-dibromo-4-aminophenol | 3.12 g. |
| sodium carbonate | 20.0 g. |
| potassium bromide | 1.0 g. |
| sodium sulfite | 2.0 g. |
| water to 1 liter | |
| pH of 11.0 | |

The sample is conventionally fixed, washed, bleached, washed, fixed, washed and dried.

The spectrophotometric profile of the resulting indophenol dye is illustrated by Curve A in FIG. 1. The curve shows that the dye is unsuited as a yellow image dye.

B. The above coating sample is then immersed for 1 minute in 1 liter of an aqueous solution (pH, 10.0) containing 0.5 g. of laurylpyridinium p-toluenesulfonate, washed and dried. The so-treated sample now contains an 'onium indophenoxide image dye whose spectrophotometric profile is represented by Curve A' in FIG. 1. The curve represents a dye which has excellent spectrophotometric properties as a yellow image dye.

The spectrophotometric readings are made at the highest dye density (Dmax) areas in each of the two samples. The maximum density point (Dmax) of the dye represented by Curve A in FIG. 1 lies outside the visible region of the electromagnetic spectrum, i.e., in the U.V. region of the spectrum. The point therefore cannot be recorded on the conventional graph paper. The maximum density point of the dye represented by Curve A' (Dmax = 2.1) lies at the desirable wavelength (λmax) of about 450 nm. (nanometers). Moreover, the dye represented by Curve A' has low unwanted absorption in the green and red regions of the spectrum.

(C) Similar results are obtained when laurylpyridinium p-toluenesulfonate is present in the color developing solution and the post-treatment of the coating in a separate bath is omitted.

EXAMPLE 2

Figure 2:
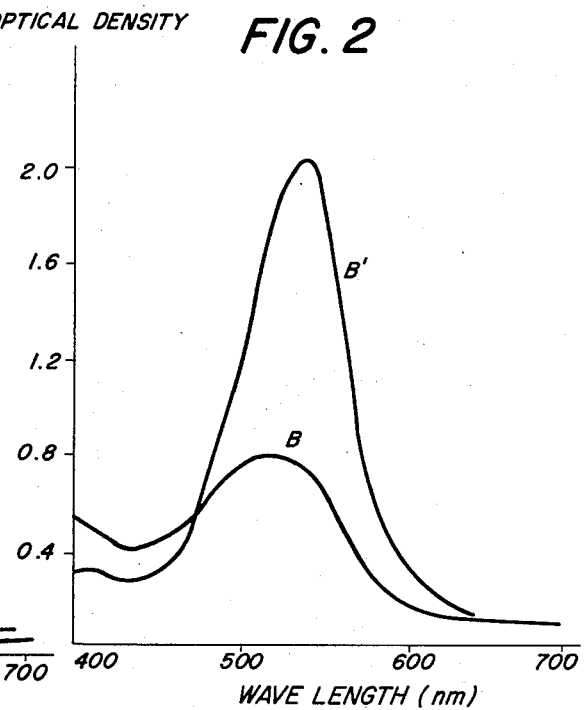

The procedure described in Example 1 is repeated with a sample of a similar coating containing the magenta-dye-forming coupler 1-(2,4,6-trichlorophenyl)-3-[2-chloro-5-($\alpha$-(4-hydroxy-3-tert-butylphenoxy)tetradecanoamido)anilino]-5-pyrazolone (Coupler II). The results are illustrated in FIG. 2 (see Curves B, B').

Curve B represents an indophenol dye which is unsuited as a magenta image dye because of its low absorption in the green and high absorption in the blue regions of the spectrum. Curve B' represents an 'onium indophenoxide dye which has desirable spectrophotometric properties as a magenta image dye. Note in particular the high extinction coefficient, the desirable position of the absorption maximum ($\lambda$max) and the narrow band width. The spectrophotometric readings again are made at the Dmax areas in each of the two samples.

EXAMPLE 3

Figure 3:
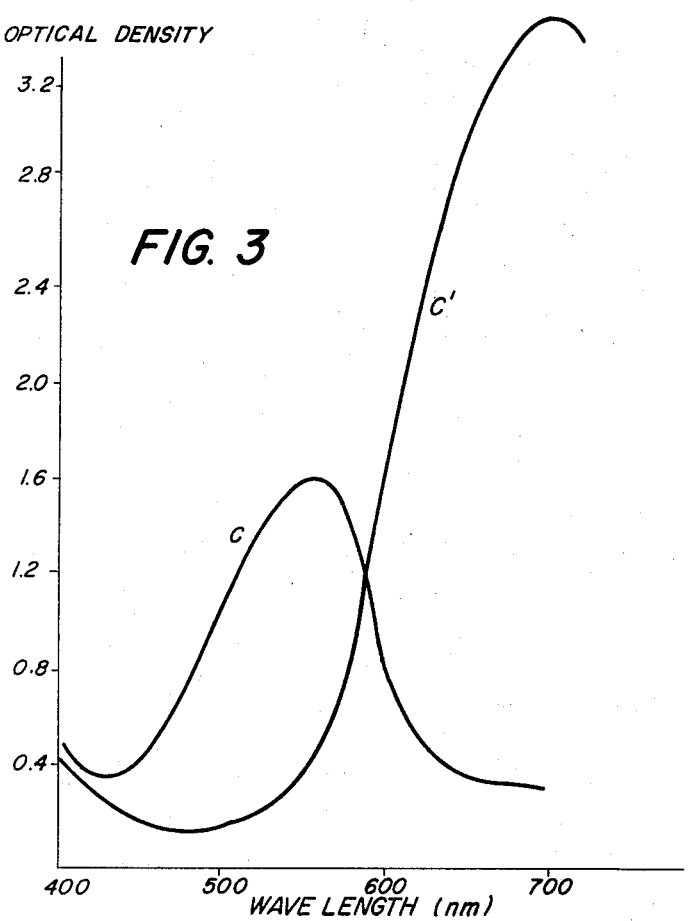

The procedures described in Examples 1 and 2 are repeated with a sample of a similar coating containing the cyandye-forming coupler 1-hydroxy-2-[$\Delta$-(2,4-di-tert-amylphenoxy)-n-butyl]naphthamide (Coupler III). The results are illustrated in FIG. 3 (see Curves C and C').

Curve C represents an indophenol dye which is unsuited as a cyan image dye because of its low absorption in the red and very high absorption in the green and blue regions of the spectrum. Curve C' represents an 'onium indophenoxide dye which has desirable spectrophotometric properties as a cyan image dye. The dye has a very high extinction coefficient, narrow band width and low absorption in the blue and red regions of the spectrum.

EXAMPLE 4

A. Samples of three single-layer silver halide emulsion coatings, each of which contain respectively the yellow-, magenta- and cyan-dye-forming couplers of Examples 1, 2 and 3, are exposed, processed and post-treated with the quaternary compound laurylpyridinium p-toluene sulfonate by the procedures described in the preceding examples.

Figure 4:
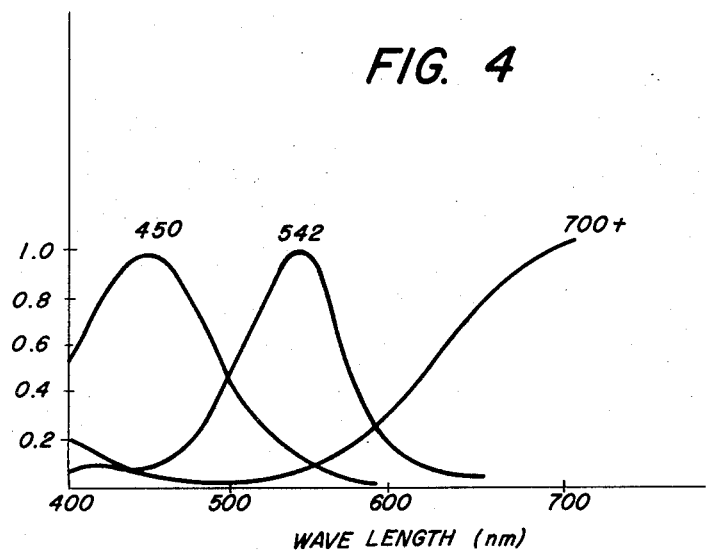

The spectrophotometric profiles of the dyes of the so-processed samples are represented by the three curves in FIG. 4. These curves are "normalized" curves, i.e., the curves are recorded by taking the spectrophotometric readings, not at the maximum density of the dye images (Dmax), but rather at the selected density of 1.00 in each of the three samples.

B. The procedures described in section (A) above are repeated, but with the following modifications:

1. The aminophenol color developing agent 2,6-dibromo-4-aminophenol is replaced with an equal molar quantity of the phenylenediamine color developing agent 4-amino-3-methyl-N-ethyl-N-$\beta$-(methanesulfonamido)ethylaniline; and 2. The processed samples are not post-treated with the quaternary salt.

Figure 5:
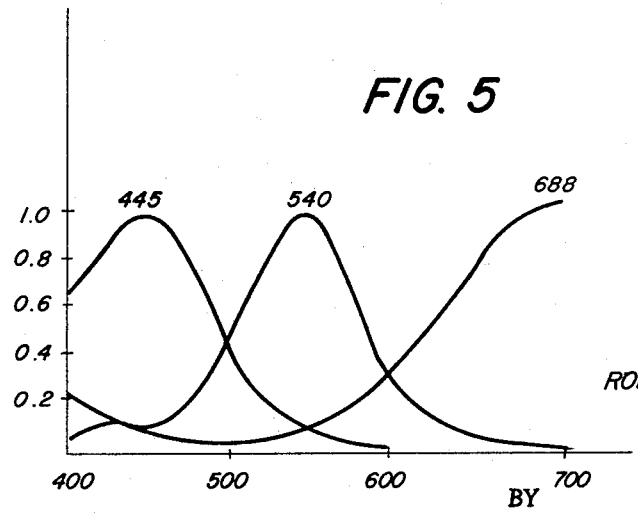

The spectrophotometric profiles of the dyes in these three samples are shown in FIG. 5.

A comparison between the curves in FIGS. 4 and 5 shows the desirable spectrophotometric properties of the dyes produced by the procedures according to our invention to produce the 'onium indophenoxide (i.e., the procedure described in section (A) above). Notice in particular the narrow band width and low blue absorption of the magenta dye represented by the center curve in FIG. 4.

Similar results are obtained when a sulfonium or phosphonium salt is used in place of the quaternary ammonium salt. Similar results are also obtained when the individual layers of the above elements are incorporated into one multilayer, three-color element with silver halide emulsions sensitized to blue, green and red light respectively.

EXAMPLE 5 (cyan image dyes)

A. A sample of a supported single-layer silver halide emulsion coating of the type described in Example 1, and containing the cyan-dye-forming coupler, Coupler III of Example 3, is sensitometrically exposed, developed for 30 minutes in the color developing solution described in Example 1, fixed, washed, bleached, washed, fixed, washed and dried. The spectrophotometric profile of the dye exhibits an optical density of about 0.3 at 650 and an absorption curve which is not useful for cyan image dye.

The spectrophotometric readings in the samples described in this example and in the following Examples 6, 7 and 8 are taken at the tenth step on the H and D curve representing the corresponding dye image.

B. A second sample of the above coating is treated by the procedure described in section (A) above, and subsequently immersed for 2 minutes in a buffered alkaline solution of pH 11.0, then washed for 10 minutes and dried. A bathochromic shift of the indophenol dye takes place producing an optical density at 650 of about 0.8 as the result of its treatment with the alkaline solution. Although shifted, the dye has undergone only little increase in its extinction coefficient, and it still absorbs excessively in the green region of the spectrum. Not until the treatment with a quaternary compound will the indophenol dye be shifted and simultaneously increased in density to provide a useful cyan 'onium indophenoxide dye image. This aspect is demonstrated in the following sections (C) and (D).

C. The processing of a third sample of the above coating by the procedure described in section (B) above, including the sample's immersion for 2 minutes in a 1-liter portion of a pH 11.0, buffered alkaline solution containing 0.5 gram of laurylpyridinium p-toluenesulfonate, produces the cyan dye with an optical density of about 1.4 at 650 and 1.8 at 700.

D. A repeat of the procedure described in section (C) above with a pH 11.0, buffered alkaline solution wherein the laurylpyridinium p-toluene sulfonate is replaced with an equal quantity of cetyltrimethylammonium bromide produces the cyan dye with an optical density of 1.3 at 650 and about 1.4 at 700.

E. A repeat of the procedure described in section (D) above with an alkaline cetyltrimethylammonium bromide solution whose pH has been lowered from 11.0 to 7.0 produces the cyan dye of somewhat lower optical density at 650–700. However, high concentrations of the quaternary compound in the alkaline processing solution at pH 7.0 results in the production of a cyan dye which is spectrophotometrically similar to the onium indophenoxide image dyes in Sections (C) and (D) above.

EXAMPLE 6 (yellow image dyes)

A. A sample of a single-layer silver halide emulsion coating of the type described in Example 1, and containing the yellow-dye-forming Coupler I, is exposed and treated by the procedure described in section (A) of Example 5. The spectrophotometric profile of the produced dye has an optical density of about 0.2 at 450. The dye is not useful as a yellow image dye.

B. The treatment of a second sample of the above coating by the procedure described in section (B) of Example 5 produces the dye having an optical density of about 0.55 and 450. Again, the alkaline solution has shifted the dye bathochromically, but the simultaneous increase in the dye's extinction coefficient is observed only when the alkaline solution contains an 'onium compound wherein the 'onium indophenoxide is produced. This aspect is demonstrated in the following section.

C. A third sample of the above coating is processed by the procedure described in section (C) of Example 5. The produced image dye has an optical density of about 0.85 at 450.

D. A repeat of the procedure described in section (C) above with alkaline quaternary ammonium salt solutions of reduced pH's 7.0 and 5.0 respectively produces the dyes having optical densities of about 0.75 and 0.65 at 450. It is noted that the pH range for the shifting of a yellow image dye is extended from 11.0 to 5.0. Again, an increase in the concentration of quaternary ammonium salt in the alkaline processing solutions of pH 7.0 and 5.0 improves the extinction coefficient of the produced yellow dyes.

EXAMPLE 7 (magenta image dyes)

A. A sample of a single-layer, silver halide emulsion coating of the type described in Example 1, and containing the magenta-dye-forming Coupler II is exposed and treated by the procedure described in section (A) of Example 5. The spectrophotometric profile of the produced dye has an optical density of about 0.3 at 550. The dye is not useful as a magenta image dye.

B. The treatment of a second sample of the above coating by the procedure described in section (B) of Example 5 produces the dye having an optical density at 550 of about 0.55. It is noted that in this case the initial dye spectral absorption (section (A)) is shifted bathochromically, and the dye's extinction coefficient is increased somewhat. A further shift and density increase are effected when the alkaline processing solution contains a quaternary compound. This aspect is demonstrated in the following sections (C) and (D).

C. A repeat of the procedure described in section (C) of Example 5 with a sample of the above coating produces the dye having an optical density of about 0.7 at about 550.

D. A repeat of the procedure described in section (D) of Example 5 with a sample of the above coating produces the dye having an optical density of about 0.7 at about 550.

E. A repeat of the procedure described in section (D) above with alkaline quaternary ammonium salt solutions of reduced pH's 7.0 and 5.0 respectively produces the dyes having optical densities of 0.7 and 0.7 at 550. It is noted that the pH range for the shifting of a magenta image dye is extended from 11.0 to lower than about 5.0. Again, an increase in the concentration of Q-salt in the alkaline processing solutions of pH's 7.0 and 5.0 improves the extinction coefficient of the produced magenta dyes.

EXAMPLE 8

Samples of a supported single-layer gelatinous silver halide emulsion coating, containing per square foot of coating 300 mg. of gelatin, 100 mg. of silver, 135 mg. of yellow-dye-forming Coupler I and 68 mg. of coupler solvent dibutyl phthalate, are exposed through a graduated-density test object.

Following the exposure, two strips of the coating sample are processed in a developer solution 0.014 molar in color developer 3-bromo-4-aminophenol. Other substances in the developer solution are the same as those in Example 1. The pH is adjusted to 12.5. The development time is adjusted to maximize the density scale. After development, the strips are fixed, washed, bleached, washed, fixed, washed and dried in a conventional sequence of operations.

One of the two strips is soaked for 1 minute in a 0.5 percent aqueous solution of cetyltrimethylammonium bromide at pH 12.5, after which it is washed in water and dried. A step of the developed image containing dye with Dmax between 1.5 and 2.0 is selected for a 360–800 nm. scan in a recording spectrophotometer. This absorption is represented by Curve A' in FIG. 6.

A control strip is treated in similar fashion, omitting only the soak in the solution of cetyltrimethylammonium bromide. After drying, the exposure step corresponding to the same numerical exposure value used in the strip treated with cetyltrimethylammonium bromide is read in the spectrophotometer. The absorption obtained is represented as Curve A in FIG. 6. This curve has a Dmax which lies in the ultraviolet region; hence, the dye is unsuitable for adequate blue-light modulation. Curve A', which represents the absorption spectrum of the specimen treated with cetyltrimethylammonium bromide, is observed to be shifted bathochromically compared with that of the untreated specimen. The absorption spectrum altered with cetyltrimethylammonium bromide has desirable features with respect to blue-light modulation and minimum of unwanted absorption in the green and red regions of the spectrum.

EXAMPLE 9

Samples of a single-layer gelatinous silver halide emulsion coating on a transparent support, containing per square foot of coating 100 mg. of silver, 300 mg. of gelatin, 168 mg. of magenta-dye-forming coupler 1-[4-(p-tert-butylphenoxy)-phenyl]-3-[α-(p-tert-butylphenoxy)propionamido]-4-[2-phenyl-5-(1,3,4)-oxadiazolylthio]-5-pyrazolone and 84 mg. coupler solvent tricresyl phosphate, are exposed and processed exactly as described in Example 8.

From a strip processed and soaked in cetyltrimethylammonium bromide, a step having a Dmax between 1.5 and 2.0 is selected for spectrophotometric recording. This record is shown in FIG. 7 as Curve B'. From a strip (control) processed but not soaked in cetyltrimethylammonium bromide, the same numerical exposure step is read in the spectrophotometer. This record is Curve B in FIG. 7.

Curve B (untreated specimen) in FIG. 7 represents a red dye which has a low extinction coefficient and is unsuitable for modulation of green light.

Absorption of the same dye associated with cetyltrimethylammonium bromide is bathochromically shifted to a position in the spectrum (Curve B') which makes it suitable for good green-light modulation. The cetyltrimethylammonium bromide-dye interaction product has a high extinction and little unwanted absorptions in spectral regions outside green.

EXAMPLE 10

Samples of a single-layer gelatinous silver halide emulsion coating on a transparent support, containing per square foot of coating 100 mg. of silver, 300 mg. of gelatin, 110 mg. of cyan-dye-forming Coupler III and 55 mg. of coupler solvent tricresyl phosphate, are exposed and processed exactly as described in the procedure given in Example 8.

From a strip processed and soaked in cetyltrimethylammonium bromide, a step having a Dmax between 1.5 and 2.0 is selected for spectrophotometric recording. This record is shown in FIG. 8 as Curve C'. From a strip (control) processed but not soaked in cetyltrimethylammonium bromide, the same numerical exposure step is read in the spectrophotometer. This record is Curve C in FIG. 8.

The unmodified dye is a magenta of low extinction unsuitable for modulation of red light. The 'onium indophenoxide dye is shifted bathochromically to become cyan with a high extinction coefficient. There is comparatively small unwanted absorption in regions of the spectrum other than red.

EXAMPLES 11, 14, 17, 20 and 23 (yellow dyes)

The procedures given in Example 8 are repeated, substituting for the color developer the respective color developers shown in column 2, Table 1, below. Results obtained are shown in columns 3-4 wherein Curves A' and A refer respectively to samples treated with cetyltrimethylammonium bromide and untreated samples.

TABLE 1

Figure 9:
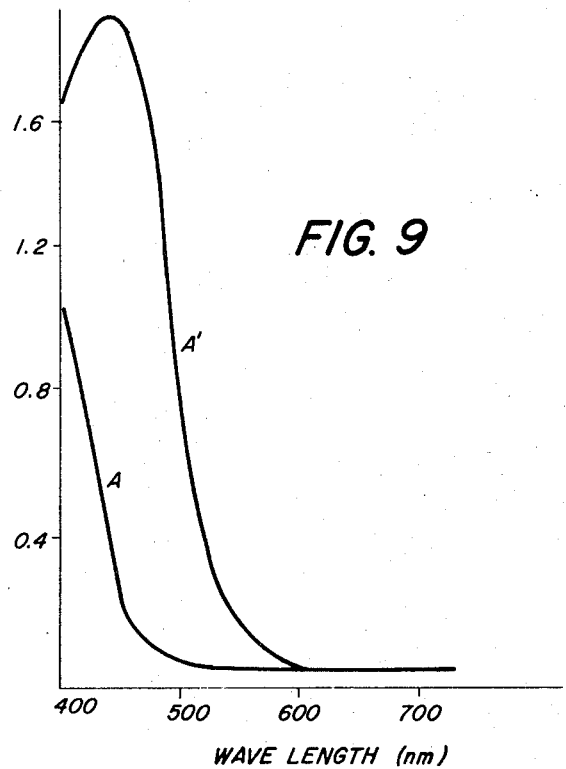

| Example | Color Developer | Peak Optical Density in Visible Spectrum | |
|---|---|---|---|
| | | Before | After |
| 11 | D-1 | 0.9 at 400 | 1.7 at 450 |
| 14 | D-2 | 0.8 at 400 | 1.6 at 450 |
| 17 | D-3 | see FIG. 9 | |
| 20 | D-4 | 0.9 at 400 | 1.9 at 450 |
| 23 | D-5 | 0.7 at 400 | 1.7 at 450 |

Developers D-1 - D-5 in Examples 11-25 have the following formulas:

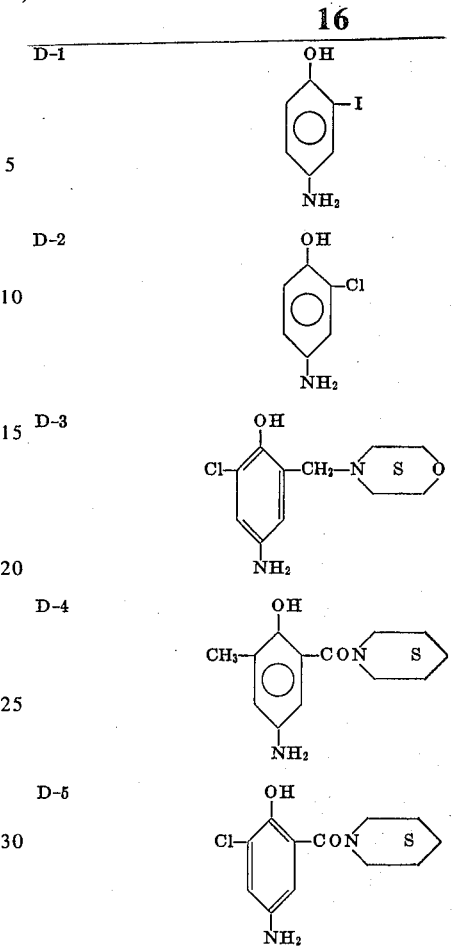

EXAMPLES 12, 15, 18, 21 and 24 (magenta dyes)

The procedures given in Example 9 are repeated, substituting for the color developer the respective color developers shown in column 2, Table 2, below. Results obtained are shown in columns 3-4, wherein Curves B' and B refer respectively to samples treated with cetyltrimethylammonium bromide and untreated samples.

TABLE 2

Figure 10:
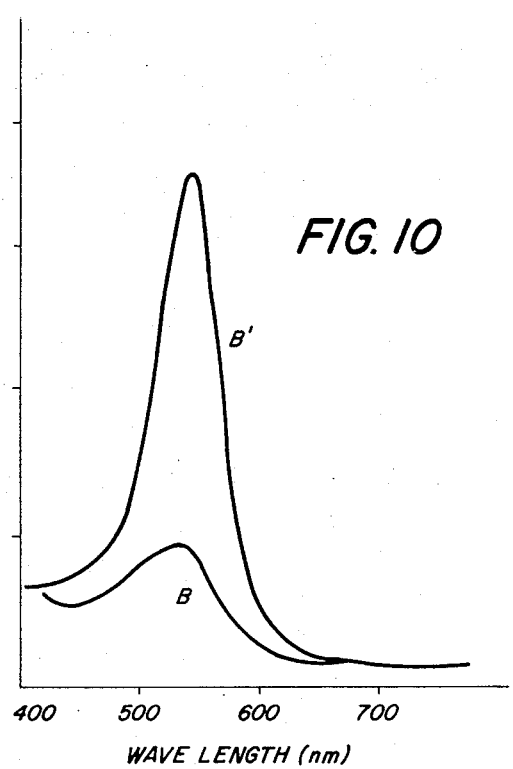

| Example | Color Developer | Peak Optical Density in Visible Spectrum | |
|---|---|---|---|
| | | Before | After |
| 12 | D-1 | 0.4 at 400 | 1.3 at 550 |
| 15 | D-2 | 0.4 at 550 | 1.4 at 550 |
| 18 | D-3 | see FIG. 10 | |
| 21 | D-4 | 0.3 at 400 | 1.2 at 550 |
| 24 | D-5 | 0.8 at 525 | 1.8 at 550 |

EXAMPLES 13, 16, 19, 22 and 25 (cyan dyes)

The procedures given in Example 10 are repeated, substituting for the color developer the respective color developers shown in column 2, Table 3, below. Results obtained are shown in corresponding figures listed in columns 3-4, wherein Curves C' and C of FIG. 11 refer respectively to samples treated with cetyltrimethylammonium bromide and untreated samples.

TABLE 3

Figure 11:
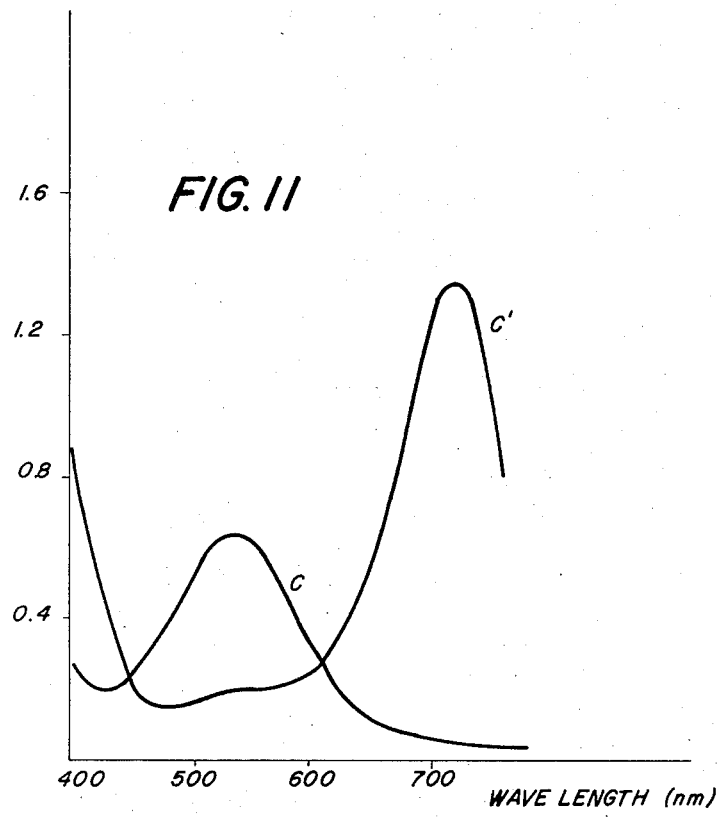

| Example | Color Developer | Peak Optical Density in Visible Spectrum | |
|---|---|---|---|
| | | Before | After |
| 13 | D-1 | 0.7 at 525 | 1.6 at 700 |
| 16 | D-2 | 0.55 at 525 | 1.6 at 700 |
| 19 | D-3 | see FIG. 11 | |
| 22 | D-4 | 0.5 at 550 | 1.4 at 700 |
| 25 | D-5 | 0.4 at 550 | 1.6 at 700 |

EXAMPLES 26–48 (evaluation of other p-aminophenol derivatives)

Similar results are obtained when the procedures described in Examples 8–25 are repeated with the p-aminophenol color developing agents listed below.

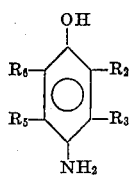

| Example | R₂ | R₃ | R₅ | R₆ |
|---|---|---|---|---|
| 26 | —C₆H₅ | H | H | H |
| 27 | —CH₂N(C₂H₅)₂·2HCl | H | H | H |
| 28 | —CO—N(piperidine) | H | H | C₆H₅ |
| 29 | —Cl | H | —CH₃ | H |
| 30 | —CH₂—N⁺(picoline)·Cl⁻ | H | H | H |
| 31 | —C₄H₉-t | H | H | H |
| 32 | —Br | H | H | H |
| 33 | —CH₃ | H | —Cl | H |
| 34 | —Br | —CH₃ | H | Br |
| 35 | H | —C₄H₉-t | H | H |
| 36 | —Cl | —CH₃ | H | —Cl |
| 37 | —Cl | H | H | H |
| 38 | —CO—N(piperidine) | H | H | H |
| 39 | H | F | H | H |
| 40 | —Cl | H | H | —Cl |
| 41 | —COOH | H | H | —Cl |
| 42 | —SO₂C₆H₅ | H | H | H |
| 43 | —SO₂C₆H₅ | H | —OCH₃ | H |
| 44 | —COOH | H | H | —CH₃ |
| 45 | —COOH | H | H | H |
| 46 | —CONH₂ | H | H | H |
| 47 | —CF₃ | H | H | H |
| 48 | —Cl | OCH₃ | H | Cl |

Where the coupler and the developer produce a diffusible dye, good image stability can be obtained when using water-insoluble polymeric 'onium mordants such as polyvinyl pyridinium compounds or even coacervates such as disclosed in Bush, U.S. Pat. No. 3,271,147 issued Sept. 6, 1966, which are located in close association with the diffusible dye to provide the 'onium indophenoxide image dye.

EXAMPLE 49

A three-color, photographic element is made using fogged, direct-positive, silver halide emulsions prepared according to Illingsworth, U.S. Pat. No. 3,501,307 issued Mar. 17, 1970. A blue-sensitive emulsion layer is associated with the yellow Coupler I, a green-sensitive emulsion layer is associated with the magenta Coupler II and a red-sensitive emulsion layer is associated with the cyan Coupler III. The photographic element is exposed and developed in a color surface-image developing composition in the presence of cetyltrimethylammonium bromide and then fixed and washed thoroughly to provide a good positive color image.

EXAMPLE 50

Examples 8 and 11–25 are repeated with the exception that in the post-treatment cetyltrimethylammonium bromide is replaced with a 0.5 percent aqueous solution of the following 'onium compounds:

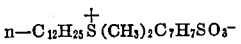
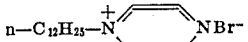
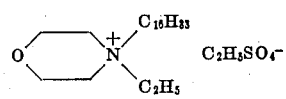
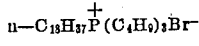
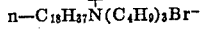
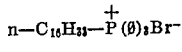
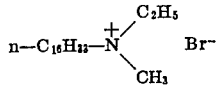
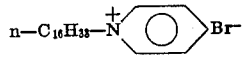
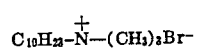
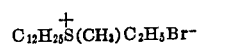
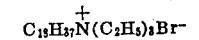

Improvements similar to those reported in Examples 8 and 11–25 are obtained with these 'onium compounds in the extinction coefficients and absorption shifts.

EXAMPLE 51

Example 3 is repeated except the cyan dye-forming coupler is a Fischer-type coupler of the formula:

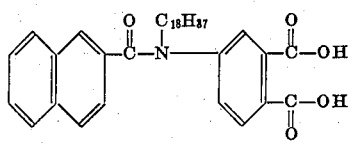

The post-process solution contains cetyltrimethylammonium bromide as the 'onium compound. Results similar to Example 3 are observed.

The procedure is repeated with similar results when the developing composition contains the developing agents of Examples 14, 20, 28 and 30 instead of 2,6-dibromo-4-aminophenol.

EXAMPLE 52

Water-insoluble dyes are formed imagewise when couplers and color developers are allowed to diffuse from a processing solution into a film.

Strips of film containing graduated amounts of developed silver are produced from a coating containing 75 mg./ft.$^2$ of silver bromide fine-grain emulsion in 300 mg./ft.$^2$ gelatin, by a graduated-scale sensitometric exposure followed by conventional black-white development, fixing and washing. The developed silver is then oxidized to silver bromide by bromination, giving a scale in silver bromide. The coatings are then fogged and divided into three sets of two strips each.

A. Duplicate samples are then color-developed for 2 minutes at a temperature of 25° C. with the following composition:

PROCESSING SOLUTION $5-10^{-3}$ mol./l. of coupler α-benzoyl-2-methoxyacetanilide solubilized with small amounts of dimethyl formamide
$1.5-10^{-2}$ mol./l. of developer 1,6-dibromo-4-aminophenol
.65 g./l. Na$_2$SO$_3$
1.00 g./l. NaBr
13.25 g./l. K$_3$PO$_4$
pH adjusted to 12.0

The samples are then washed, fixed, washed, bleached, washed, fixed, washed and dried in a conventional processing procedure.

One of the film strips prepared in this fashion is dipped in 0.5 percent aqueous cetyltrimethylammonium bromide solution at pH 12, washed 5 minutes, then dried. The other is left untreated. Absorption spectrophotometric traces are made from corresponding exposure steps of each of these to permit comparison. The untreated sample has an absorption at 400 nm. of about 0.4 and the treated sample has a maximum density at 450 nm. of about 1.2.

B. Conditions for production of magenta dye are the same as those in A) except that the coupler used in the developing composition is 1-(2,4,6-trichlorophenyl-3-(m-nitroanilino)-5-pyrazolone and development is continued for 15 minutes instead of 2 minutes. Other procedures are unchanged. A comparison of absorption spectra for the corresponding treated sample and untreated sample shows an absorption of 1.15 at 550 nm. and .7 at 525 nm., respectively.

C. Conditions for production of cyan dye are the same as those in B) except that the coupler used in the developing composition is 1-hydroxy-2-[B-(2'-acetamido)phenethyl]naphthamide. All other procedures are unchanged from those in B). A comparison of absorption spectra of treated and untreated samples shows a maximum density of 1.35 at 675 nm. and 0.55 at 525 nm., respectively.

Dyes formed in coupling are generally unsuitable for three-color image representation. However, when the dyes are allowed to interact with the quaternary mordant, the absorption spectra shifts to regions of the spectrum where acceptable modulations of the respective three primary colors are obtained.

Similar results, i.e., good color images, are obtained when a multilayer coating of blue-sensitive, green-sensitive and red-sensitive silver halide emulsions are imagewise-exposed and processed sequentially with the above procedures which employ treatment with the cetyltrimethylammonium bromide.

Although the invention has been described in considerable detail with particular reference to certain preferred embodiments thereof, variations and modifications can be effected within the spirit and scope of the invention.

We claim:

1. A process of forming an 'onium indophenoxide dye image in a photographic element comprising reacting in said photographic element a photographic color coupler with oxidized color-developing agent which is predominantly a p-aminophenol containing a primary amino group, and providing an 'onium compound in association with the reaction product of said color coupler and said color-developing agent.

2. A process according to claim 1 wherein said 'onium compound is provided in said photographic element after obtaining the reaction product of said oxidized color developer and said color coupler.

3. A process according to claim 1 wherein said photographic color coupler is a nondiffusible compound present in at least one layer of said photographic element.

4. A process according to claim 1 wherein said 'onium indophenoxide image dye is substantially nondiffusible in said photographic element.

5. A process according to claim 1 wherein said 'onium compound is a quaternary ammonium salt and is provided in sufficient quantity to combine with substantially all of said reaction product.

6. A process according to claim 1 wherein said photographic color coupler is a phenolic compound, a pyrazolone compound or a compound having an open-chain active methylene group.

7. A process according to claim 1 wherein said p-aminophenol has the formula:

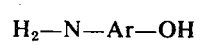

where Ar is an arylene group.

8. A process according to claim 7 wherein said arylene group contains halogen atoms in positions ortho or meta to said nitrogen substitution.

9. A process according to claim 1 wherein said 'onium compound is a water-soluble quaternary ammonium salt which is contacted with the reaction product of said photographic color coupler and said p-aminophenol.

10. A process according to claim 1 wherein said 'onium compound is a water-insoluble quaternary ammonium salt and the reaction product of said photographic color coupler and said p-aminophenol is contacted with said quaternary ammonium salt.

11. A process of forming an 'onium indophenoxide dye image in an imagewise-exposed photographic element which comprises 1) a support, 2) at least one layer thereon containing a silver halide composition and 3) at least one layer in association with said silver halide composition containing a photographic color coupler, said process comprising contacting said photographic element with a silver halide developing composition comprising a silver halide color-developing agent which is predominantly a p-aminophenol containing a primary amino group, to provide an imagewise distribution of oxidized color-developing agent, and reacting said oxidized color-developing agent with said color coupler, with the provision that an 'onium compound is provided in association with the reaction product of said color coupler and said oxidized color developer.

12. A process according to claim 11 wherein said 'onium compound is present in at least one layer of said photographic element.

13. A process according to claim 11 wherein said photographic element comprises a layer comprising a blue-sensitive silver halide emulsion in association with a yellow-forming color coupler, a layer comprising a green-sensitive silver halide emulsion in association with a magenta-forming color coupler, and a red-sensitive emulsion in association with a cyanforming color coupler.

14. A process according to claim 13 wherein said silver halide emulsions are fogged, direct-positive, silver halide emulsions.

15. A process according to claim 13 wherein said silver halide emulsions are unfogged, silver halide emulsions.

16. A process according to claim 13 wherein said color couplers are nondiffusing color couplers.

17. A process according to claim 11 wherein said 'onium compound is a quaternary ammonium salt.

18. A process according to claim 11 wherein said 'onium compound is cetyltrimethylammonium bromide.

19. A process according to claim 11 wherein said color-developing agent consists essentially of said p-aminophenol.

20. A process according to claim 11 wherein said 'onium compound is provided in sufficient concentration to combine with substantially all of the reaction product formed between the p-aminophenol and said color coupler.

21. A photographic element, a support and at least one layer thereon comprising an 'onium indophenoxide.

22. A photographic element according to claim 21 wherein said 'onium indophenoxide has the formula:

$$(COUP)=N-Ar-O-\ ^{+}M$$

wherein (COUP) is a color coupler, Ar is an arylene group comprising from six to 20 carbon atoms and M is an 'onium group.

23. A photographic element comprising at least one layer containing a silver halide emulsion, at least one layer in association with said silver halide emulsion containing a color-forming coupler and at least one layer containing a color-developing agent which is predominantly a p-aminophenol containing a primary amino group and which is present in sufficient concentration to produce a visible image dye by reaction with said silver halide emulsion.

24. A photographic element according to claim 23 comprising at least one layer in association with said color-forming coupler which contains an 'onium compound.

25. A photographic element according to claim 24 wherein said 'onium compound is a quaternary ammonium salt.

26. A process of providing a bathochromic, spectrophotometric absorption shift in an imagewise distribution of an indophenol dye located in a photographic element, comprising the step of contacting said indophenol dye with an 'onium salt to form an 'onium indophenoxide.

27. A process according to claim 26 wherein said 'onium compound is a quaternary ammonium salt, a tertiary sulfonium salt or a quaternary phosphonium salt.

28. A process of forming an 'onium indophenoxide comprising reacting a photographic color coupler with an oxidized p-aminophenol containing a primary amino group wherein an 'onium compound is provided in association with the reaction product of said color coupler and said p-aminophenol.

29. A process according to claim 28 wherein said photographic color coupler is a phenolic compound, a pyrazolone compound or a compound having an open-chain active methylene group and said p-aminophenol has the formula:

$$H_2-N-Ar-OH$$

wherein Ar is an arylene group.

30. A process according to claim 28 wherein said 'onium compound is a quaternary ammonium salt.

* * * * *